United States Patent [19]
Durum

[11] 4,036,032
[45] July 19, 1977

[54] UNIVERSAL JOINT
[75] Inventor: Metin Mustafa Durum, Elmhurst, Ill.
[73] Assignee: Borg-Warner Corporation, Chicago, Ill.
[21] Appl. No.: 637,903
[22] Filed: Dec. 5, 1975
[51] Int. Cl.² ............................................. F16D 3/30
[52] U.S. Cl. ............................................. 64/21; 64/8
[58] Field of Search ................................. 64/21, 8, 7

[56] References Cited
U.S. PATENT DOCUMENTS

| 3,125,870 | 3/1964 | Orain | 64/21 |
|---|---|---|---|
| 3,792,598 | 2/1974 | Orain | 64/21 |
| 3,877,251 | 4/1975 | Wahlmark | 64/21 |
| 3,942,335 | 3/1976 | Orain | 64/21 |

Primary Examiner—Samuel Scott
Assistant Examiner—Randall Heald
Attorney, Agent, or Firm—Robert L. Zieg

[57] ABSTRACT

A constant velocity universal joint for transmission of torque between driving and driven shafts, wherein a drum member is secured to one of the shafts on which are mounted at least three trunnions each having a ball member slidably and rotationally mounted thereon. Ball members have a generally spherical outer surface and the other shaft has a grooved member thereon having at least three cooperating grooves receiving the ball members. The trunnions extend inwardly from the drum member and are connected together at the inner end thereof.

9 Claims, 8 Drawing Figures

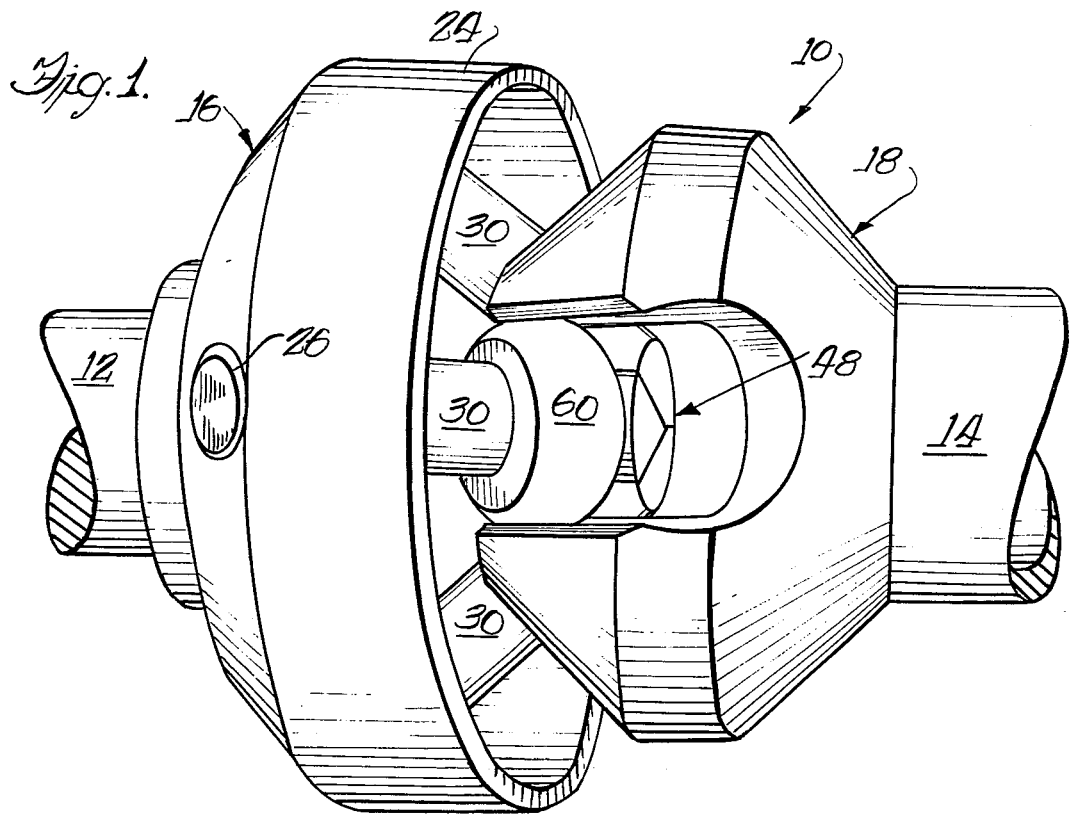
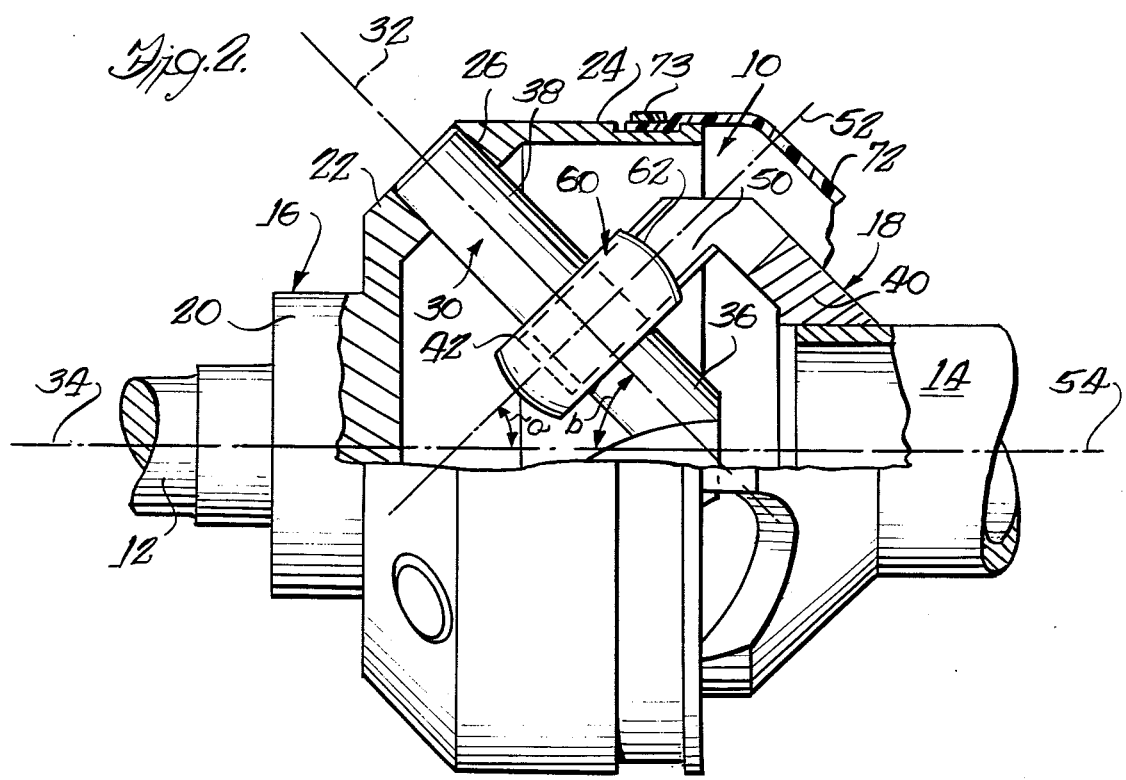

UNIVERSAL JOINT

BACKGROUND OF THE INVENTION

The invention herein relates to the field of universal joints and more particularly to constant velocity universal joints.

It is known in the prior art (as, for example, U.S. Pat. No. 3,125,870) to have a universal joint with three trunnion members mounted at an acute angle on a driving shaft and having partial ball members rotationally and slidably mounted thereon and received in cooperating grooves on the driven shaft, the grooves also extending at an acute angle with respect to the shafts to provide a constant velocity universal joint. It has been recognized in this type of universal joint that the trunnions mounting the partial ball members are subject to distortion under torque load since the outer ends thereof are unsupported and torque is applied thereto only at the inner end where connected to the driving shaft.

Copending application Ser. No. 637,902 filed 12/5/75 of common assignee describes an improvement in the above joint structure wherein there is no distortion under substantial torque loads, because the outer or remote ends of the trunnions are supported.

It is an object of the present invention to provide a constant velocity universal joint of the type described above wherein proper support for the trunnions is provided to prevent distortion and wherein the inherent weakness in a joint of the type described above in the central part of the grooved member adjacent its shaft due to the relatively thin section of metal at the inner terminus of the grooves is obviated.

It is a further object of the present invention to provide a universal joint of the type described wherein greater angular displacement between driving and driven shafts may be accommodated while maintaining full torque capacity through the joint.

SUMMARY OF THE INVENTION

The present invention achieves the above-desired objects in a constant velocity joint of the type described by providing a drum member connected to one shaft, the drum member supporting trunnions which are mounted to extend inwardly from the drum member toward the axis of the one shaft and toward the other shaft. In addition, the inner ends of the trunnion members meet and are welded or secured together whereby the trunnions are properly supported to prevent distortion thereof. In addition, since the grooves which receive the partial ball members mounted on the trunnions are formed in a member mounted on the other shaft and extend inwardly toward the other shaft, a relatively thick section of metal is provided between the grooves, increasing and enhancing the torque capacity of the universal joint. In addition, since the trunnion members extend inwardly being mounted to the drum member at their outer ends, greater freedom of angular movement is provided between driving and driven shafts than in known universal joints having trunnion members with rollable, slidable ball members thereon received in matching grooves in a driven member.

BRIEF DESCRIPTION OF THE DRAWINGS

Referring to the drawings,

FIG. 1 shows in perspective view a universal joint of the type described herein;

FIG. 2 shows a partial cross-sectional view of the joint of FIG. 1 embodying the principles of the present invention;

BRIEF DESCRIPTION OF THE PREFERRED EMBODIMENT

Figure 3:
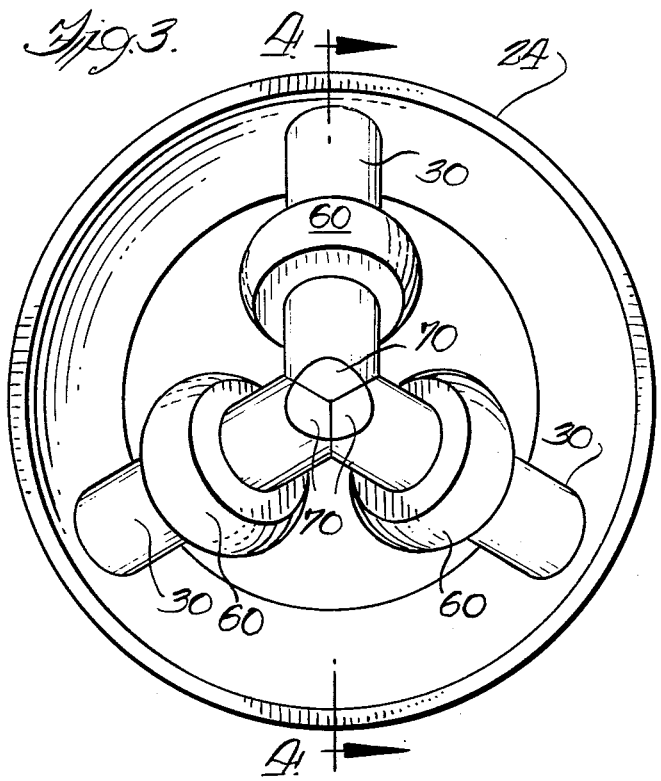
FIG. 3 is an end view of the driving member of the present invention illustrating the trunnion members in place.
Figure 4:
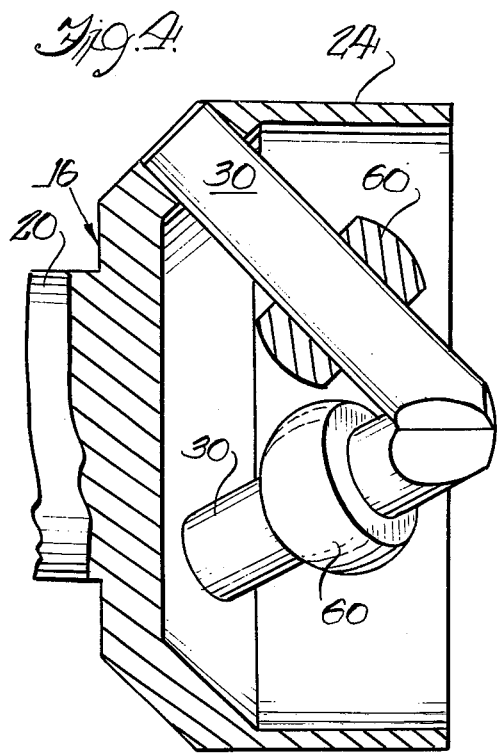
FIG. 4 is a view taken along the lines 4—4 of FIG. 3.
Figure 5:
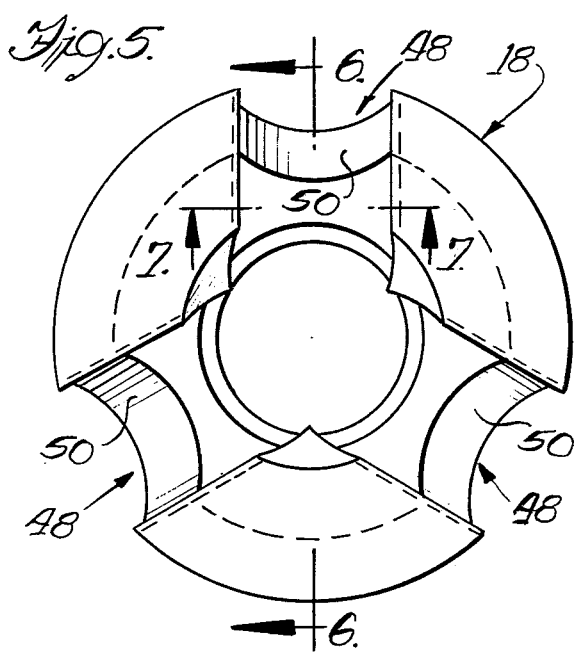
FIG. 5 is an end view of the driven member showing the construction of the grooves therein.
Figure 6:
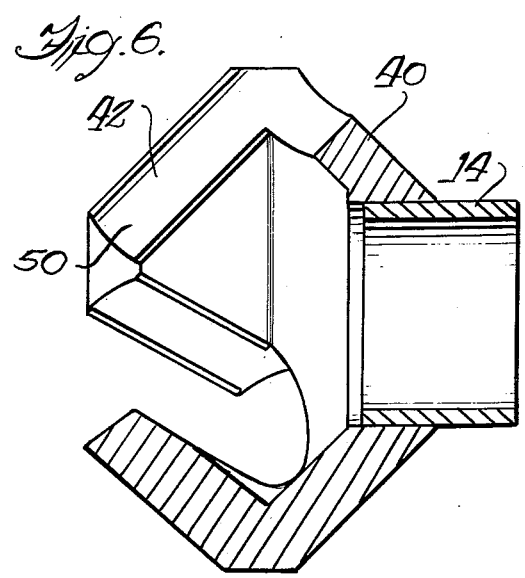
FIG. 6 is a cross-sectional view taken along the lines 6—6 of FIG. 5.
Figure 7:
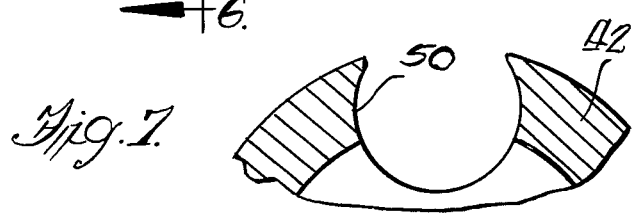
FIG. 7 is a cross-sectional view taken along the lines 7—7 of FIG. 6.

Referring to FIGS. 1 and 2, a universal joint 10 is illustrated which is adapted to provide for constant velocity drive between a shaft 12 and a shaft 14. As will be described in greater detail, the present universal joint drivingly interconnects the shafts 12 and 14 such that when they are rotated with their axes at any angle up to the maximum permissible joint angle, the angular velocity of the two shafts is always exactly the same regardless of the position in a rotational cycle of 360°. Thus, the universal joint 10 always provides what is commonly referred to as a "constant velocity" drive as distinguished from drives provided by "non-constant velocity" universal joints which are of many types and well known in the field. Thus, when reference is made to the present universal joint 10 as a constant velocity joint, the above definition is intended. It should be noted that shafts 12 and 14 are not specifically referred to as driving or drive herein, it being understood that the shafts may be alternately driving or driven shafts during operation of joint 10 depending upon the direction of torque transfer.

Connected to shaft 12 is a trunnion supporting or drum member 16, and connected to shaft 14 is a race or groove member 18. Member 16 has a hub portion 20, a flange portion 22 extending at an angle with respect to shafts 12 and 14, and an axially extending cover portion 24. Member 16 has a plurality of bores 26 in flange portion 22 each receiving a pin or trunnion 30. Trunnions 30 extend at right angles with respect to flange 22, and each have a central longitudinal axis 32 which extends at an acute angle $a$ with respect to a longitudinal axis 34 of shaft 12. Trunnions 30 have an inner end portion 36 and an outer or remote end portion 38.

Member 18 has a flange portion 40 connected to shaft 14 and a generally conical shaped inwardly extending portion 42. Provided in portion 42 are a plurality of races or grooves 48 which are partly cylindrical in form, the number of grooves 48 corresponding to the number of trunnions 30 utilized. The grooves 48 have cylindrical surfaces 50 on either side thereof. The grooves 48 have a longitudinal central axis 52 which extends at an acute angle $b$ with respect to the longitudinal central axis 54 of shaft 14.

A coupling or partial ball member 60 is provided on each trunnion 30. Although not illustrated, coupling members 60 may have centrally thereof bearings, such as needle bearings or anti-friction materials, mounting coupling members on trunnions 30. Coupling members 60 are adapted to rotate with respect to trunnions 30 and may also slide with respect to trunnions 30 along longitudinal axis 32. Coupling members 60 have a generally spherical surface 62 thereon which has a radius substantially similar to the radius of surfaces 50 of grooves 48 to provide for proper cooperative action therebetween.

In a preferred embodiment of the present invention, acute angles $a$ and $b$ would be equal to obtain a nonorbitting, self-supporting, homokinetic constant velocity joint with axial freedom and to permit more than three trunnions and coupling members, if desired. When torque is transmitted between the shafts, drive will be transmitted through the medium of ball members 60 and grooves 48 between shaft 12 and shaft 14. In FIG. 2, shafts 12 and 14 are shown in alignment with their axes 34 and 54 coincident. However, when the axes intersect at an angle, and the shafts rotate, drive will be transmitted with the ball members 60 accommodating the universal action by rolling and sliding on trunnions 30.

Trunnions 30 are provided at their inner ends 36 with surfaces 70 thereon. When the supports 30 are in place in bores 26, the inner ends have their surfaces 70 in engagement. The inner ends may thus be joined by electron beam welding or other welding techniques. Also, the inner ends 36 could be received in a hub member to provide for securing the inner ends together or may be secured in any convenient manner using resistance welding or other techniques.

A flexible rubber boot 72 may be provided as shown in FIG. 2 to seal the joint against dirt and other contaminants in operation, the boot 72 flexing when the joint is operating with shafts 12 and 14 at an angle. The boot 72 may be secured to drum member 16 by a band 73.

With the construction provided by the present invention, with the inner ends of trunnions 30 connected together and properly supported without a shaft extension as used in copending application Ser. No. 637,902, distortion of the trunnions under load will be prevented and the torque capacity of joint 10 is enhanced.

In addition to the above advantages, by providing grooves 48 extending inwardly toward the shaft and terminating in an open space in the interior of the joint as opposed to having them extend outwardly from the shaft as shown in U.S. Pat. No. 3,125,870, the condition of a narrow section of metal between the grooves and interference between the hub and the ball members is prevented, resulting in increased torque and angular capacity of the joint.

Figure 8:
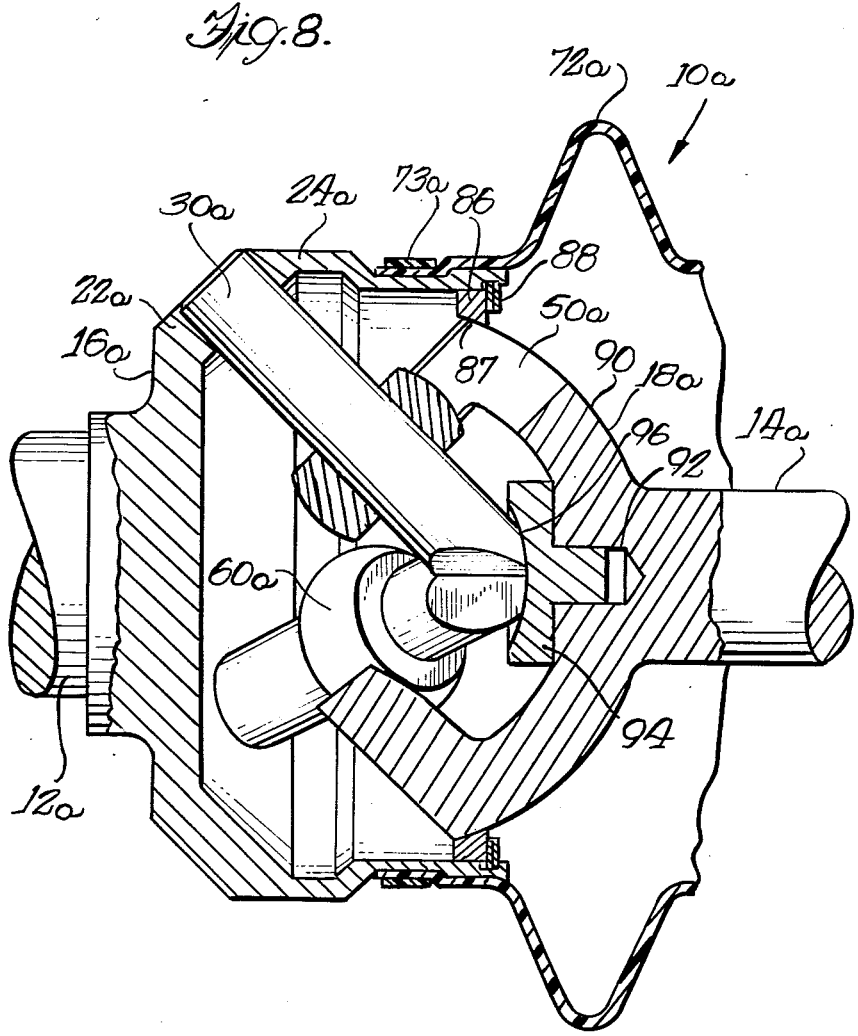
FIG. 8 is a cross-sectional view of modified form of the joint of FIGS. 1 and 2.

Referring to FIG. 8, a modified form of the present invention is illustrated having means to provide for axial restraint to provide a joint suitable for applications which demand an axial restraint. Elements of FIG. 8 which are identical to those of FIG. 2 carry the same numeral with the addition of the suffix $a$.

A thrust ring 86 is provided mounted internally of axially extending portion 24a of drum member 16a. Thrust ring 86 is secured in portion 24a by a snap ring 88. Ring 86 has an internal curved surface 87. Grooved member 18a also has an external curved spherical surface 90 in contact with surface 87. Member 18a also includes a central bore 92 having a pilot member 94 mounted therein which has a concave surface 96 which is concentric with surface 90 in contact with and facing the ends of pins 30a.

In operation, the joint of FIG. 8 is like that of FIG. 2; however, it is assembled with surface 96 in contact with the end of pins 30a and surfaces 87 and 90 engaged to provide an axial restraint for the joint. Instead of providing a thrust ring 86 and using engagement of spherical surface 90 and surface 87 to provide axial restraint, a spring load may be used to urge shafts 12a and 14a together or the surface of ball members 60a may be slightly toroidal rather than spherical to create an axial force between the balls and the grooves to bias the shafts together.

From the above, it will be apparent that the present invention provides a unique constant velocity universal joint in which three or more trunnion members are used having a rollable, slidable ball member mounted thereon wherein distortion of the trunnions is prevented by providing a connection between the end of the trunnions so that the pins are properly supported and prevented from changing angle with respect to the shaft.

What is claimed is:

1. A universal joint for the transmission of torque between two shafts comprising a drum member coupled to one of said shafts, at least three trunnions connected to and extending inwardly from said drum member at an acute angle with respect to said one shaft, said trunnions having an end remote from said drum member, a coupling member rotationally and slidably mounted on each of said trunnions, said groove member having at least three grooves extending inwardly at an acute angle with respect to said other shaft, said coupling members being received within said grooves whereby torque can be transmitted between said shafts when said shafts are at an angle, and said trunnions being secured together at said remote ends.

2. A universal joint as claimed in claim 1, wherein said coupling members comprise partial ball members having a generally spherical outer surface in engagement with said grooves.

3. A universal joint as claimed in claim 2, wherein said grooves define partly cylindrical surfaces having a radius similar to that of said generally spherical surfaces to provide for cooperating contact therebetween.

4. A universal joint for the transmission of torque between two shafts comprising a drum member coupled to one of said shafts, a groove member coupled to the other of said shafts, at least three trunnions connected to and extending inwardly from said drum member at a first acute angle with respect to said one shaft, said trunnions having an end remote from said drum member, a ball member rotationally and slidably mounted on each of said trunnions, said groove member having at least three grooves extending inwardly at a second acute angle with respect to said other shaft, said coupling members being received within said grooves whereby torque can be transmitted between said shafts when said shafts are at an angle, said trunnions being secured together at said remote ends, and said first and second acute angles being equal.

5. A universal joint as claimed in claim 4, wherein said ball members have a generally spherical outer surface and said grooves defining partly cylindrical surfaces having a radius similar to that of said generally spherical surfaces to provide for cooperating contact therebetween.

6. A universal joint as claimed in claim 1 wherein said trunnions are secured together at said remote ends by welding.

7. A universal joint as claimed in claim 4 wherein said trunnions are secured together at said remote ends by welding.

8. A universal joint as claimed in claim 1 in which said groove member includes a centrally located pilot member having a restraining surface thereon, said remote ends of the trunnions contacting said surface and being supported thereby, and said drum member having a bearing member in contact with said groove member to provide a thrust bearing for said groove member.

9. A universal joint as claimed in claim 4 in which said groove member includes a centrally located pilot member having a retraining surface thereon, said remote ends of the trunnions contacting said surface and being supported thereby, and said drum member having a bearing member in contact with said groove member to provide a thrust bearing for said groove member.

* * * * *

UNITED STATES PATENT OFFICE
CERTIFICATE OF CORRECTION

PATENT NO. : 4,036,032
DATED : July 19, 1977
INVENTOR(S) : METIN MUSTAFA DURUM

It is certified that error appears in the above-identified patent and that said Letters Patent are hereby corrected as shown below:

The following correction is made under the provisions of Rule 323 --

Column 4, line 17, after "shafts," insert -- a groove member connected to the other of said shafts, --

*Signed and Sealed this*

*Eighteenth* Day of *October 1977*

[SEAL]

Attest:

RUTH C. MASON
*Attesting Officer*

LUTRELLE F. PARKER
*Acting Commissioner of Patents and Trademarks*